Oct. 26, 1965  N. E. PEARSON  3,213,681
SHEAR GAUGE PRESSURE-MEASURING DEVICE
Filed May 21, 1963
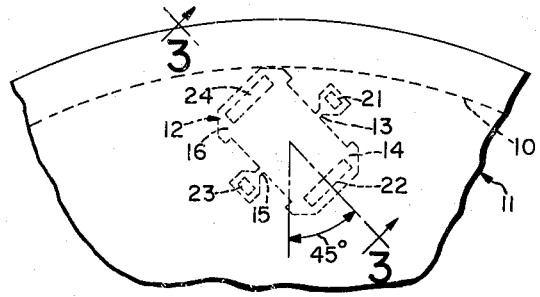
FIG. 1
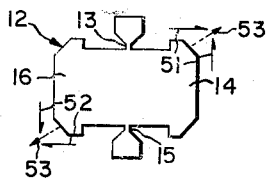
FIG. 4
FIG. 3
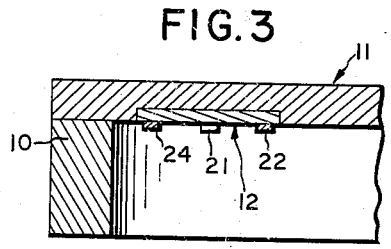
FIG. 5
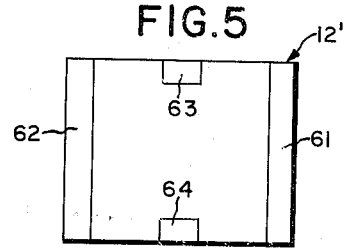
FIG. 2
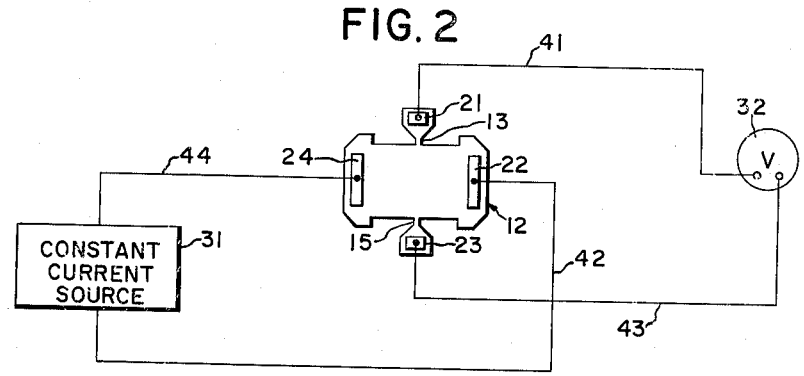
INVENTOR.
NOLAN E. PEARSON
BY
ATTORNEYS United States Patent Office 3,213,681
Patented Oct. 26, 1965

3,213,681
SHEAR GAUGE PRESSURE-MEASURING
DEVICE
Nolan E. Pearson, Menlo Park, Calif., assignor to Fairchild Camera and Instrument Corporation, Syosset, N.Y., a corporation of Delaware
Filed May 21, 1963, Ser. No. 281,921
9 Claims. (Cl. 73—141)

The present invention relates to an improvement in gauge which uses an improved transducer producing a direct voltage output proportional to the shear stress resulting from applied pressure.

It is well known in the art that many materials experience variation in electrical resistance with the application of stresses; and various devices and instruments have been developed for the measurement of strain by this means. Conventionally, strain gauges provide a change in resistance with the application of stress, so that in order to obtain useable results it becomes necessary to transform their resistance change into a voltage output. This transformation commonly requires the use of bridge or potentiometer circuitry. Serious difficulties have been encountered in use of semiconductor materials for strain gauges and the like, because of resistance variations in the material brought about by temperature variations. In conventional applications, it is necessary to differentiate between the signals actually resulting from applied stresses and those caused only by temperature changes. Making this distinction has proven quite troublesome and has, in fact, limited the applicability of semiconducting materials to strain gauge technology.

Although it is known that application of a shear strain to a semiconductor which has an electric current flowing in the strain plane will produce a voltage perpendicular to the current path, prior-art use of this knowledge has been limited to applications such as torsion-sensing devices. The shear gauges used in the present invention employ the piezo-resistive output of semiconductor material to produce a direct voltage output proportional to the shear forces resulting from applied pressure. There is no need to compensate for ambient temperature variations during the use of the device. The devices hereof have zero output voltage when on pressure is applied. As a consequence (when provided with a constant-current input), the output voltage from the devices is independent of changes in resistance of the material brought about by ambient temperature variations. A direct voltage output proportional to pressure-induced longitudinal or shear strain is the result, providing a material advance in the field of pressure gauges. The appreciable reduction in temperature sensitivity realized by the transducers of this invention materially reduces the complexity of associated equipment formerly needed to compensate for temperature effects.

Particular embodiments of the present invention are illustrated in the accompanying drawings, wherein:

FIG. 1 is a plan view, partially broken away, looking up from the bottom of a shear gauge transducer mounted on a pressure diaphragm, in accordance with the present invention;

FIG. 2 is a schematic circuit diagram of electrical connections which may be used to complete the gauge;

FIG. 3 is a sectional view taken in the plane 3—3 of FIG. 1, and shows the transducer mounted upon a cylindrical support for measuring pressure;

FIG. 4 is a diagrammatic representation of strain gauge responses in accordance with applied forces; and FIG. 5 is a plan view of an alternative transducer configuration.

Considering the present invention in somewhat greater detail, it is first noted that a wide variety of semiconductor materials may be employed. The following discussion will be particularly oriented to the semiconductor material silicon, inasmuch as this material has a well-developed technology and is known to have a large shear piezoresistive coefficient. In the preferred embodiment illustrated in FIGS. 1 and 3, a wafer 11 of semiconductor material (which may, as stated, be silicon) is used as the pressure diaphragm. The surface of the wafer is substantially planar, as indicated. Its thickness depends upon its radius and the pressure it must withstand. Suitable dimensions may easily be selected by those skilled in the art. In conformity with semiconductor practice, wafer 11 is formed as a monocrystalline unit. It may have either N-type or P-type conductivity, produced either by uniform doping during crystal growth of by uniform diffusion of an impurity; both techniques are well known in the art. The doping level of the wafer is generally about $10^{12}$ to $10^{17}$ atoms/cc., although this level is not critical. The wafer doping merely provides for electrical isolation of the sensor element to be diffused thereon. The device will respond to a given shear stress with a higher output if wafer 11 is oriented in the (100) plane of the crystal from which it is taken (in the case of P-type dopants in silicon, for example).

The wafer then has a selected impurity or dopant diffused into it to establish a smaller region of the opposite conductivity type as a sensor 12. A PN junction will be formed between the wafer 11 and the sensor 12, isolating the sensor electrically from the remainder of the wafer. Concentration of the diffused impurities in the sensor region is generally about $10^{18}$ to $10^{19}$ atoms/cc. As the doping level increases, the sensitivity of the gauge decreases, and lower doping levels are therefore preferable. Diffusion is notably difficult to control below about $10^{18}$, however, so it is not easy to obtain lower levels. Nevertheless, where suitable diffusion techniques are available, it may be desirable to use the lower concentrations of impurities in order to improve sensitivity.

The depth of sensor element 12 may be minimal, e.g., 5 microns; this can easily be accomplished by conventional diffusion techniques known in the semiconductor art. The advantages to be gained by this diffused sensor element are set forth in the co-pending patent application of Wendell M. Lafky, filed in the U.S. Patent Office on August 18, 1960, Serial No. 50,510. Primarily, such a diffused element combines the advantages of electrical isolation with mechanical intimacy.

As illustrated in FIG. 1, the sensor element of the present invention has a cruciform configuration with four arms 13, 14, 15, and 16. Opposite arms 13 and 15 are aligned, as are the other opposite arms 14 and 16, to form the cross of the sensor element. One advantage of the pressure diaphragm of this invention is its complete lack of output voltage except when pressure is applied across its surface. In achieving this characteristic, the precise alignment of arms (to which output contacts 21 and 23 are connected) is very important. Only where these arms are directly opposite one another in a straight line, will zero pressure yield zero voltage. The accuracy of the diffusion process by which sensor element 12 is formed, and the narrow shape of the arms themselves, aid in their precise alignment.

Precision alignment of sensor 12 on wafer 11 is extremely important in order to obtain optimum sensitivity to shear stresses resulting from applied pressure. The midpoint of the line between input contacts 22 and 24 should intersect the radius of wafer 11 at an angle of about 45°. This angle is shown in FIG. 1. Naturally, this angle may vary somewhat in practice, but usually with a concomitant decrease in sensitivity. As a rule, the size of sensor 12 is very small in comparison to that of the wafer, making this measurement somewhat difficult. Consequently, the line connecting input contacts 22 and 24 may be extended to meet a tangent drawn to the circumference of the wafer at the approximate point of the sensor's location; the angle of this intersection should be about 45°.

For further increase of the input level in response to shear stress, the current path (this line between contacts 22 and 24) may be oriented along the [010] crystal direction. This is accomplished by locating the sensor 12 so that the current line (between contacts 22 and 24), when properly oriented at the proper 45° angle, runs along the [010] direction. It follows, therefore, that the line between output contacts 21 and 23, which is normal to the line between the input contacts 22 and 24, will be oriented on the [001] direction.

A current is passed through the sensor element 12 between input terminals 22 and 24 which are attached to arms 14 and 16, respectively, of the sensor. These arms are normal to arms 13 and 15, from which the output voltage is measured through contacts 21 and 23. The current is preferably generated by a current source connected across the input contacts. Such a source provides very low shift, with ambient temperature variations, in sensitivity to shear stresses resultant from applied pressure.

Alternatively, a voltage source may be employed, although the result may be an increase in sensitivity shift with temperature. On the other hand, when voltage measuring arms 13 and 15 are not perfectly aligned, a voltage source will reduce any small voltage which may be present at zero pressure, in response to variations in ambient temperature. Where in fact a small voltage output exists at zero pressure, a compromise between voltage and current source may be used. Such a source is arrived at by placing a resistor across a current source. As the resistance becomes very small, the current source becomes in effect a voltage source. The value of the resistor can be selected empirically to minimize sensitivity shift and zero shift with changes in ambient temperature.

FIG. 2 is a diagrammatic illustration of the connection of a constant current source 31 between contacts 22 and 24. This connection provides a constant flow of current through the sensor between these contacts at the outer ends of the arms 14 and 16. Voltage indicating means 32 is connected between contacts 21 and 23 at the outer ends of arms 13 and 15 of the sensor. Refering to FIG. 3, diaphragm 11 may be mounted on cylinder 10 in any one of a number of ways. The thermal coefficients of expansion will match best if diaphragm and cylinder are made of the same material—e.g., silicon. Bonding between diaphragam and cylinder can then be accomplished by alloying, cementing or other such methods. Contacts for passing current to the gauge, and for measuring the output, may be formed in any conventional manner. Similarly, the electrical conductors extending from the contacts may be attached to the contacts, and thus to the sensor, by means well known in the semiconductor art.

For pressure measurement, the diaphragm and sensor are exposed to pressure, the exposed side of the diaphragm, preferably, being the side without the sensor. This orientation avoids damage to the sensor and the contacts resulting from exposure to any corrosive gases or the like which might be a part of the pressure source. Under pressure, wafer 11 is deflected inward, placing shear stresses on the arms of gauge 12. As a consequence, a voltage will be produced between the ends of opposed arms 13 and 15, which are disposed perpendicularly to the energized arms.

Not only will the transducers of the invention produce output voltages directly proportional to applied stress, but furthermore, they will produce output voltages proportional to any shear strain that can be resolved into a combination of tensile and compressive stresses. This feature is schematically indicated in FIG. 4. The sensor 12 is shown with certain possible applied forces—indicated by the broken-line arrows 53 at its corners. These actual applied forces can be resolved into the forces represented by the solid arrows 51 and 52. With a constant current flowing along the length of the opposed arms 14 and 16, application of the forces represented by arrows 51 and 52 will cause a variation in certain piezoresistive properties of the sensor between the arms. This variation will be reflected in a change in output voltage, as explained earlier.

A wide latitude of physical configurations may be employed in the devices described above. Thus, the cruciform configuration illustrated in FIG. 1 has been found desirable because of the precise determinability of the active sensor area defined by the intersecting arms of the cross. Alternative configurations are possible and may, for example, be dictated by particular applications of the invention. It is possible to form the sensor as a circle, ellipse, square, or other convenient shape. In FIG. 5, a sensor 12', in accordance with this invention, has the shape of a square. Electrical energizing contacts 61 and 62 may be applied across opposite ends of this sensor for the application of an appropriate current. Output contacts 63 and 64, connected to opposite edges of the alternate sides of the square, provide for the measurement or indication of a voltage developed perpendicularly to the direction of current flow through the application of stresses to the sensor. This configuration may be employed in a variety of electrical circuits, such as that shown in FIG. 2. It will be appreciated that the active area of this square shape includes substantially the entire sensor area, although the square is diffused into a larger wafer, such as that shown in FIG. 1.

A material advancement in pressure-sensing devices has been provided through the production of a direct voltage output requiring no potentiometer or bridge circuitry, and the production of an output which, with constant current input, is essentially independent of ambient temperature variations. Another advantage of the shear-sensing pressure gauge of this invention is the extremely small area required of the sensor region. Yet, in spite of the sensor's small size, the output voltage produced in response to a given strain is fully as highly as that produced by a two-element strain gauge of the type used in the prior art. The small size of the sensor makes possible a very high degree of uniformity and control of doping level throughout the sensor. Furthermore, elimination of an extra sensing element eliminates any possibility of errors resulting from differences between the characteristics of the multiple elements.

Throughout the above description, "pressure" has been described as hydrostatic pressure, i.e., pressure which is uniformly distributed over the entire surface of the diaphragm. However, the use of the gauge of the invention is clearly not limited to hydrostatic pressure. For example, pressure created by the force of another body pushing upon one portion of the diaphragm surface can also be measured. Such a force, for example, may be found in an accelerometer. Many other types of forces may also be employed to produce the measured pressure.

Although the present invention has been described in connection with a particular preferred embodiment and certain variations, it is not intended to limit the invention by the terms of this description of illustrated details; instead, reference is made to the appended claims for a precise delineation of the true scope of this invention.

What is claimed is:

1. An improved semiconductor pressure diaphragm comprising:
   a monocrylstalline wafer of semiconducting material primarily of one conductivity type having disposed therein a region of the opposite conductivity type extending to the surface of said wafer, said wafer being oriented in a crystal plane having a large shear coefficient;
   a pair of aligned input contacts engaging said region, the line between said contacts extending along a crystal direction having a large shear coefficient and passing through said region in a direction with respect to the wafer radius passing through said region selected to provide maximum shear stress when pressure is applied across the surface of said diaphragm; and a pair of output conductors engaging said region and spaced apart on the surface thereof along a line normal to said line between said input contacts for developing a voltage between said output conductors proportional to the shear stress applied to said wafer as a result of said applied pressure.

2. The pressure diaphragm of claim 1 wherein said crystal direction is the [010] direction.

3. The pressure diaphragm of claim 2 wherein said crystal plane is the (100) plane.

4. An improved semiconductor pressure diaphragm comprising:

a circular monocrystalline wafer of semiconductor material primarily of one conductivity type having disposed therein a region of the opposite conductivity type extending to the surface of said wafer, said wafer being oriented in a crystal plane having a large shear coefficient;

a pair of aligned input contacts engaging said region, the line between said contacts extending along the [010] crystal direction, the midpoint of said line intersecting the radius of said circular wafer drawn to said midpoint at an angle selected to provide maximum shear stress when pressure is applied across the surface of said diaphragm; and a pair of output conductors engaging said region and spaced apart on the surface of said region along a line normal to said line between said input contacts for developing a voltage between said output conductors proportional to the shear stress applied to said wafer as a result of said applied pressure.

5. The pressure diaphragm of claim 4 wherein said crystal plane is the (100) plane.

6. The improved semiconductor pressure diaphragm of claim 4 further defined by said angle being about 45°.

7. An improved semiconductor pressure gauge comprising:

a monocrystalline wafer of semiconducting material primarily of one conductivity type having disposed therein a region of the opposite conductivity type extending to the surface of said wafer, said wafer being oriented in a crystal plane having a large shear coefficient;

a pair of aligned input contacts engaging said region, the line between said contacts passing through said region in a direction with respect to the wafer radius passing through said region selected to provide maximum shear stress when pressure is applied across the surface of said diaphragm;

a cylinder of the same semiconducting material as said wafer having said wafer mounted on its end, said cylinder adapted to hold rigid the periphery of said wafer while allowing the interior of said wafer to deflect in the direction away from said applied pressure;

a pair of output conductors engaging said region and spaced apart on the surface thereof along a line normal to said line between said input contacts for developing a voltage between said output conductors proportional to the shear stress applied to said wafer as a result of said applied pressure; and means for measuring said voltage developed between said pair of output conductors as an indication of said applied pressure.

8. The pressure gauge of claim 7 wherein said line between said input contacts extends along a crystal direction having a large shear coefficient.

9. An improved semiconductor pressure gauge comprising:

a circular wafer of semiconducting material of one conductivity type, said wafer having a planar upper surface located in a plane of maximum shear coefficient for the wafer material;

a sensor of the opposite conductivity type diffused into said planar wafer and forming a PN junction therewith to isolate said sensor electrically from the remainder of said wafer;

a pair of contacts for passing a constant current through said sensor along a line between said contacts, the midpoint of said line intersecting the radius of said circular wafer drawn to said midpoint at an angle of about 45°;

means for mounting said wafer at its outer periphery, said means being adapted to hold the periphery of said wafer rigid while allowing the interior of said wafer to be deflected in the direction away from applied pressure in response to such applied pressure; and voltage-indicating means electrically contacting said sensor at a pair of points spaced apart on same on a line perpendicular to said line between said contacts, for indication of piezoresistive voltages generated between said pair of points by the application of pressure to one surface of said wafer, whereby such voltages are independent of temperature variations of the wafer.

References Cited by the Examiner

UNITED STATES PATENTS

| | | | |
|---|---|---|---|
| 3,049,685 | 8/62 | Wright | 338—2 |
| 3,079,576 | 2/63 | Kooiman | 338—4 |
| 3,137,834 | 5/64 | Pfann | 338—6 |

RICHARD C. QUEISSER, Primary Examiner.

DAVID SCHONBERG, Examiner.